United States Patent [19]
Guillen

[11] 3,911,671
[45] Oct. 14, 1975

[54] SNAP LINK

[76] Inventor: Rafael Guillen, 2171 Rising Glen Way, San Diego, Calif. 92139

[22] Filed: Feb. 12, 1975

[21] Appl. No.: 549,160

[52] U.S. Cl. .................... 59/89; 24/241 SL; 59/93; 294/83 R
[51] Int. Cl.² ......................................... F16G 15/04
[58] Field of Search .............. 59/85, 89, 93, 86, 88; 294/83 R, 75; 24/116 R, 241 SL, 238, 232

[56] References Cited
UNITED STATES PATENTS

| | | | |
|---|---|---|---|
| 1,475,046 | 11/1923 | Bolei | 24/241 SL |
| 2,353,939 | 7/1944 | Staats | 59/85 |
| 3,590,443 | 7/1971 | Kubsch | 24/232 |
| 3,850,468 | 11/1974 | Hultin | 294/83 R |

FOREIGN PATENTS OR APPLICATIONS

| | | | |
|---|---|---|---|
| 131,286 | 4/1951 | Sweden | 59/89 |

Primary Examiner—C. W. Lanham
Assistant Examiner—Gene P. Crosby
Attorney, Agent, or Firm—Ralph S. Branscomb

[57] ABSTRACT

The device is a releasible connecting link similar in concept to those used in chains and has two half links pivotally connected at one side, with the free ends of the half links having shoulders which seat together when the link is closed. The seating ends are provided with aligned bores which are engageable by a spring-loaded pin slideably projecting from the connected halves when the link is closed, and by withdrawing the pin a predetermined distance, one half-link is opened while the other remains closed.

6 Claims, 4 Drawing Figures

SNAP LINK

BACKGROUND OF THE INVENTION

The invention is in the field of releasible connecting links for chains and the like and is particulary adapted for use with siene nets for fishing vessels.

In commercial fishing operations, especially tuna fishing, an elongated net is deployed in the water encircling a school of fish, the net being drawn together first at the bottom and then at the top. The upper edge of the net is reinforced with a chain coextensive therewith, this chain being linked at intervals to other lengths of chain which are connected to a large purse rings, these rings being secured on a long prong mounted to or suspended from the boat when the catch is taken on board. Currently these purse rings are connected to the chain lengths by repetitive windings of heavy twine which is manually wrapped and involves considerable expediture of time by the fishermen. A permanent connection between the purse rings and the chains is not practical as the rigors of open sea fishing operations require the frequent detachment of the purse rings for maintenance.

SUMMARY OF THE INVENTION

The instant invention comprises a releasible connecting link designed particularly for connecting purse rings to connecting chains as explained above, and comprises two half links pivoted together at one side and securely closed to define two separate link portions by a bisecting sping-loaded pin projecting from a housing bore in one side of the link and engaging aligned bores in the free ends of the half links. The pin may be retracted by withdrawing an exposed knob on the mounted end thereof such that the half links are released from one another, but one half link still defines an enclosure so that the connecting chains may be released while the links remains securely engaged on the purse ring.

DETAILED DESCRIPTION OF THE PREFERRED EMBODIMENT

Figure 1:
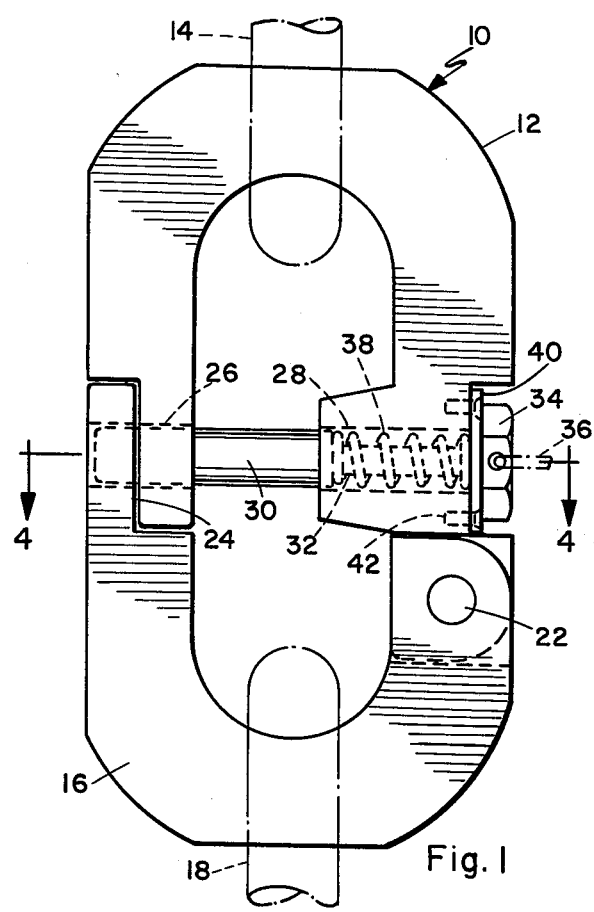
FIG. 1 is a side elevational view of the link in its closed position showing the interior structure in dashed lines.
Figure 3:
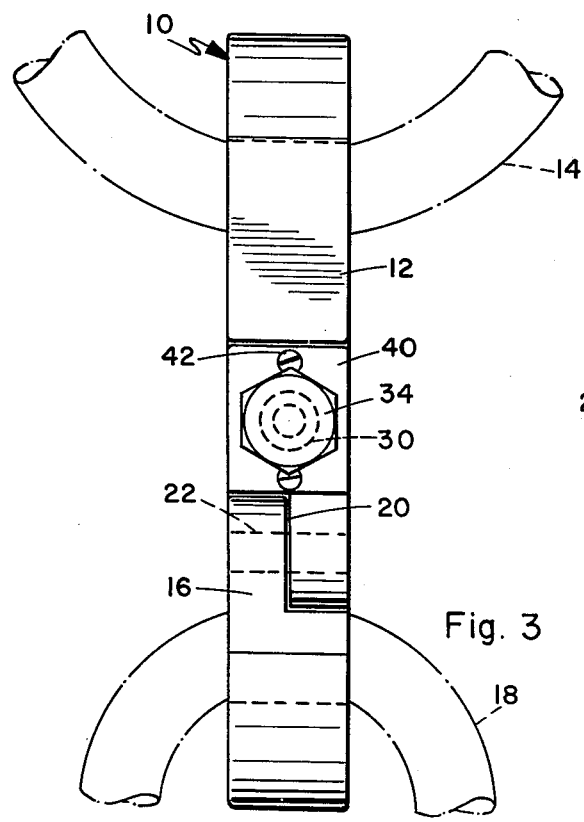
FIG. 3 is a view of the link as seen from the right side of FIG. 1.
Figure 4:
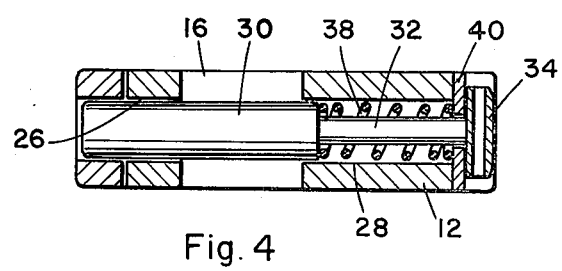
FIG. 4 is a sectional view taken along lines 4—4 of FIG. 1.

The link indicated at 10 is shown in its closed position in FIG. 1 with the upper half-link 12 engaging a purse ring 14 or the like, and the lower half 16 securing a chain link 18. The two lengths each have oppositely cut shoulders which mate together at 20, best shown in FIG. 3, and are permanently pivoted together by a pin 22 so that the bottom link is free to assume an open or a closed position as illustrated.

The free ends of the half lengths are also provided with shoulders 24 and each as a bore 26 therethrough, the bores falling into alignment when the link is closed and the shoulder seat as shown in FIG. 1.

Opposite these bores, on the other side of the link, is another aligned bore 28 through the longer leg of the upper half link. In this bore is seated a pin 30 having a reduced portion 32 and a knob or nut 34 mounted on the end of the reduced portion, this knob being used to manually disengage the lower link and optionally having ring or cord 36 to facilitate the pulling of the pin.

A coil spring 38 is disposed on the reduced portion of the pin and is captured between the larger pin portion and a retainer plate 40 is secured to the half link 12 by screws 42.

Figure 2:
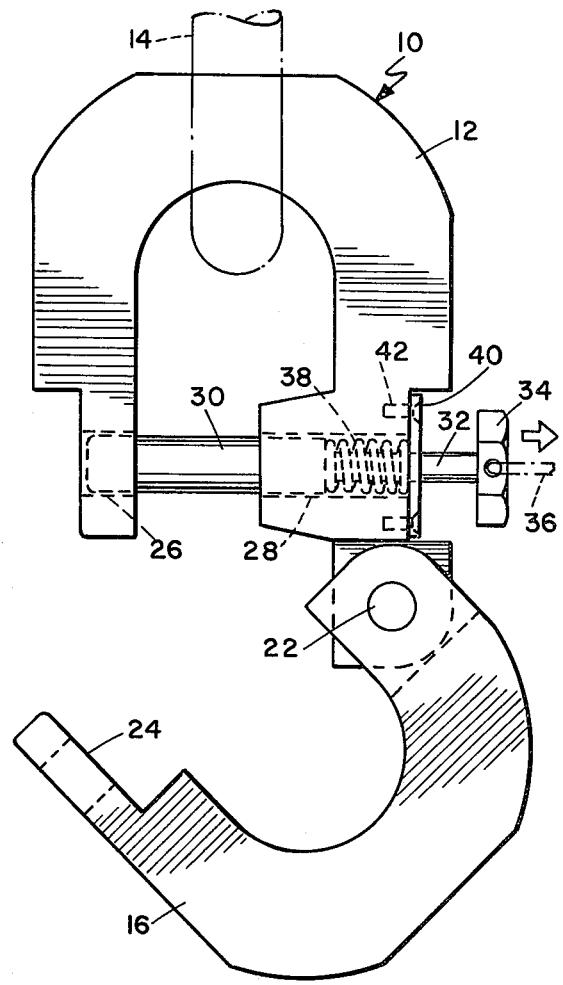
FIG. 2 is a view similar to that of FIG. 1 but showing the link in its opening position.

The simple operation of the link involves withdrawing the sping-loaded pin to open or close the link, as shown in FIG. 2, the link being firmly closed by releasing the pin when the links are seated at their free ends. It will be noted that the pin cannot be withdrawn far enough to open the upper link portion, so that engagement of the purse ring 14 is semi permanent, while the lower portion is very quickly and easily opened. To open the upper link portion to install the link on a purse ring or the like, the retainer place 40 can be removed.

I claim:

1. A releasible connecting link comprising:
   a. a first half-link having two extended ends, each of the ends having a bore therethrough such that the bores are mutually aligned;
   b. a pin sideably mounted in one of said bores and extending across said half link into the other of said bores;
   c. a second half-link pivoted to the end of said link having said pin mounted therein and having a third bore in the free end thereof, said second link being pivotable into a closed position such that the bore therein falls into alignment with said aligned bores whereby said pin may be slideably displaced to engage the third bore to define two connected halves of a single link.

2. Structure according to claim 1 wherein the free ends of said half links are recessed to define shoulders which mate when the bores therein are aligned.

3. Structure according to claim 1 wherein said pin is spring-loaded and biased into engagement with said third bore.

4. Structure according to claim 3 wherein said first link has a recessed portion adjacent the external side of the pin-mounting bore therein and said pin has a knob mounted on one end thereof which seats in said recess when the pin is engaging said third bore.

5. Structure according to claim 4 wherein said first half link is provided with a retainer plate defining the interior of said recess and said pin is provided with a reduced portion defining a shoulder thereon, and said spring is a coil spring disposed on said reduced portion and captured between said shoulder and said retaining plate.

6. Structure according to claim 5 wherein said coil spring and reduced portion are dimensioned such that the spring can be fully compressed between said shoulder and said plate prior to disengagement of either of the bores in said first half-link, whereby said first half link is not operable by displacing said pin.

* * * * *